Dec. 17, 1968     C. H. BIBER     3,416,867
PHOTOMETER USING A PRISM WITH SURFACE LENTICULATIONS
Filed June 18, 1965
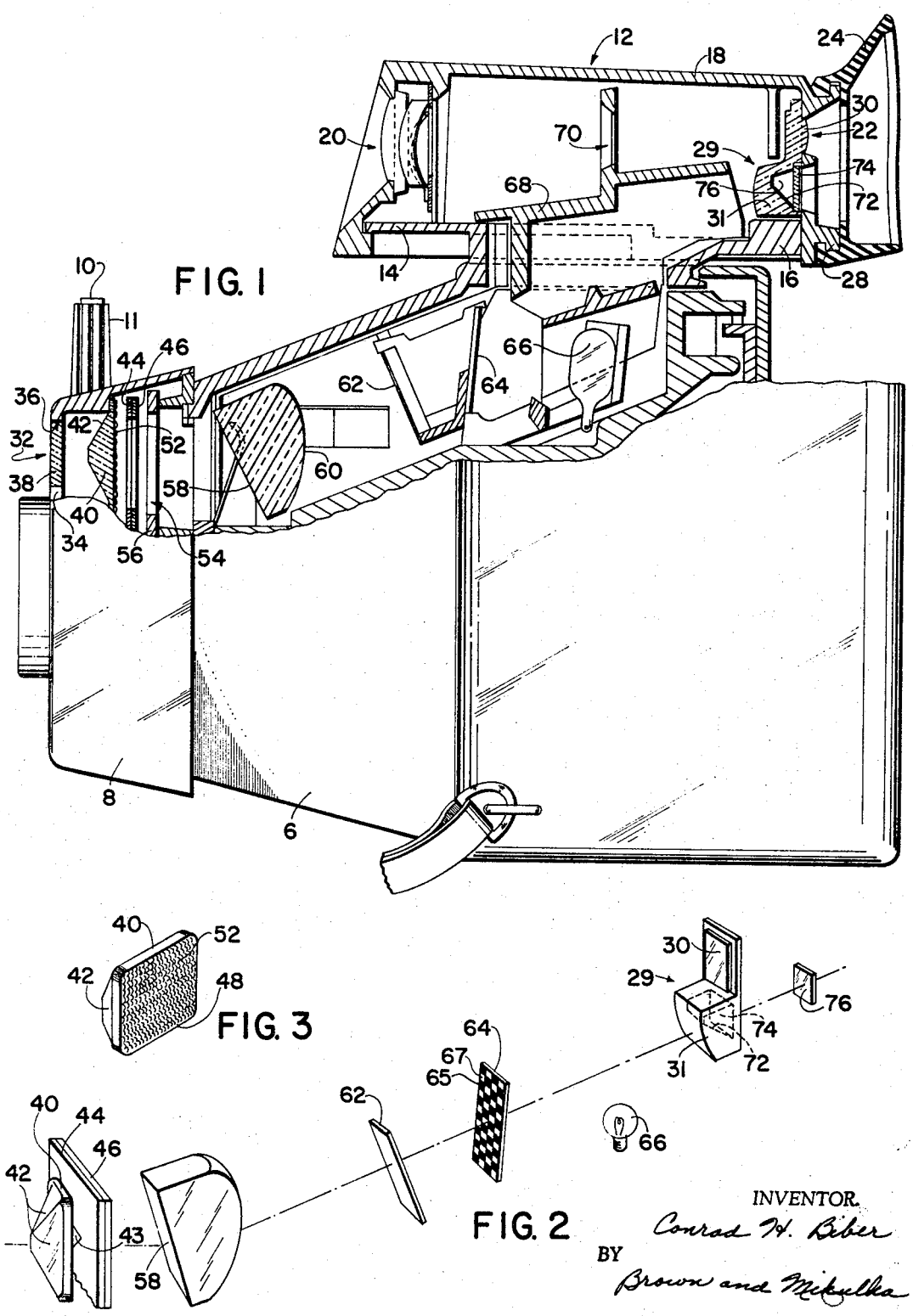
INVENTOR.
Conrad H. Biber
BY
Brown and Mikulka
ATTORNEYS

3,416,867
PHOTOMETER USING A PRISM WITH SURFACE LENTICULATIONS

Conrad H. Biber, Needham, Mass., assignor to Polaroid Corporation, Cambridge, Mass., a corporation of Delaware
Filed June 18, 1965, Ser. No. 464,980
4 Claims. (Cl. 356—230)

This invention concerns comparison photometers, and more particularly an optical system designed to form part of a comparison photometer.

This invention is useful in connection with comparison photometers of the type described in application Ser. No. 359,116, filed Apr. 13, 1964 and now Patent No. 3,323,-431, assigned to the assignee of the present invention. Such a photometer may comprise a transparent target having an opaque, reflective pattern thereon which is illuminated by a lamp having a known luminous energy output. The level of illumination of the pattern serves a standard of reference during operation of the photometer. When the photometer is mounted on a photographic camera, light from the scene to be photographed may be admitted into the photometer through a photometer aperture which may be selectively varied in size by means of an operator which conjointly controls the film exposure aperture. After passing through the photometer aperture, the light is directed to a diffuser located near the target. In operation, with the level of illumination of the reflective pattern on the target as a standard of reference, the photometer aperture is varied until the level of illumination of the diffuser, as seen through the transparent portions of the target not obstructed by the pattern, equals the level of illumination of the target pattern. At this setting of the photometer aperture, the film exposure aperture is properly set to account for the brightness of the scene.

Comparison photometers of this type require that the diffusing element displaying the scene light be brightly and uniformly illuminated in order that the eye can most accurately make the required photometric comparison. Furthermore, because the film exposure aperture is varied in area proportionally with the photometer aperture, the level of illumination of the diffuser should accurately reveal any change in the size of the photometer aperture. That is to say, any variation in the area of the photometer aperture should result in a proportional change in the amount of light admitted into the photometer.

Also, for optimum accuracy of the photometer, the collection angle of light entering the photometer at any aperture should closely approximate the angle of field of the objective lens of the camera.

Accordingly, it is an object of this invention to provide a comparison photometer with an optical system which includes an element brightly and uniformly displaying illumination proportional to that of the scene at any selected photometer aperture.

It is another object of this invention to provide a comparison photometer which includes means by which the amount of scene light entering the photometer can be accurately controlled in proportion to the area of a variable photometer aperture for the photometer.

It is a further object of this invention to provide a comparison photometer with a variable aperture which includes means for collecting light from the scene through an angle which at all apertures approximates the angle of field of the objective lens of the camera with which the photometer is used.

Other objects of this invention will in part be obvious and will in part appear hereinafter.

The invention accordingly comprises the apparatus possessing the construction, combination of elements and arrangement of parts which are exemplified in the following detailed disclosure, and the scope of the application of which is indicated in the claims.

For a fuller understanding of the nature and objects of the invention, reference should be had to the following detailed description taken in connection with the accompanying drawing wherein:

FIGURE 1 is an elevation view of a camera embodying a comparison photometer, the camera being partly broken away to show the optical system for the photometer;

FIGURE 2 is a perspective view of the optical elements comprising the optical system for the photometer, the elements being isolated from the camera for the sake of clarity; and FIGURE 3 is a perspective view from a different angle of an element of the optical system illustrated in FIGURES 1 and 2.

Referring to FIGURE 1 of the drawing it will be seen that the present invention is embodied in a photographic camera having a molded plastic housing 6. Mounted upon the front of the housing 6 is a unit 8 including the objective lens (not shown) and a shutter (not shown) actuated by knob 10, extending from the top of the unit 8. The unit 8 also includes a film exposure aperture (not shown), the area of which can be varied by means of a rotatable sleeve 11 on knob 10.

A viewfinder assembly 12 for the camera is mounted upon forward and rearward extensions of the housing 6, designated at 14 and 16, respectively. The viewfinder assembly 12 includes a viewfinder housing 18, a doublet lens 20, a viewfinder window 22, and a flexible rubber light shield 24 attached upon a rearmost end 28 of the viewfinder housing 18. A molded transparent plastic member 29 includes a viewfinder eye lens 30 in the viewfinder window 22. The member 29 includes also a photometer eye lens 31 constituting a part of the optical system for a comparison photometer for the camera embodying the essence of this invention. The photometer optical system is described below.

The optical system, in its broadest aspects, is designed efficiently to collect light from the scene to be photographed through a predetermined collection angle, efficiently to distribute the collected light uniformly across the maximum area of the variable photometer aperture, and to direct the light from the aperture to a target arrangement. With the target arrangement the level of illumination of the scene can be visually compared with a reference level of illumination of a reflective pattern on the target illuminated by a lamp having a known luminous energy output.

The optical elements of the system will be described, generally, in the order in which they receive light from the scene. The first element in the system is a window 32 in a front wall 34 of the unit 8. The window 32 comprises an opening 36 of predetermined area and boundaries which receives a transparent molded plastic member 38. For the purpose of efficiently collecting light from the scene through a pre-established collection angle, a molded pyramidal refracting prism 40 is provided, being mounted within the unit 8 immediately behind the window 32 (see FIGURE 1). The prism 40 has planar surfaces 42 sloping divergingly away from the scene which efficiently collect light from the scene through a pre-established collection angle. The collection angle is predetermined not only by the slope of the prism surfaces 42, but also by the size of the window 32 in the front wall 34 of the unit 8 and the spacing of the prism 40 from the window 32.

In order to control the amount of light entering the photometer, a photometer aperture 43 is provided. The aperture 43 is defined by a pair of apertured plates 44, 46 and disposed immediately adjacent the base 48 of the pyramidal prism 40. The plates 44, 46 are movable relative to each other to vary the size of the photometer aperture 43 in response to angular adjustments of the rotatable sleeve 11 surrounding the shutter actuator knob 10.

In the illustrated camera embodiment, the plates 44, 46 defining the photometer aperture 43 also define the film exposure aperture (not shown). The rotatable sleeve 11 serves as a common operator for the photometer aperture 43 and also for the film exposure aperture. It is evident, therefore, that for optimum accuracy of the photometer, any variation in the area of the photometer aperture 43 must result in a proportional change in the amount of light admitted from the scene into the photometer. This can be accomplished if the scene light passing through the aperture 43 is of uniform intensity throughout the maximum aperture area, with all light spots and dark areas in the scene eliminated.

In order to accomplish this end, by this invention a large number of integral, evenly spaced lenticular beads 52 are formed on the base 48 of the pyramidal prism 40 (see FIGURE 3). Each bead 52 collects light from a large part of the overall collection angle of the prism 40. Thus the large number of beads 52 equally spaced over the surface area of the base 48 have the effect of averaging the light entering the photometer from the scene across the area of the base 48. The beads 52 function not only to average the light collected by the prism, but also serve to collect and condense the light and thus enhance the efficiency of the system. Thus, by this invention, means have been provided which make possible a controlled variation in the amount of light passing through the photometer aperture 43 which is proportioned to the change in the area of the aperture.

Light passing through the photometer aperture 43, after passing through an opening 54 in a baffle 56 in the unit 8, impinges upon surface 58 of a prismatic lens 60 which deflects the light upwardly toward the rear of the viewfinder assembly 12. The prismatic lens 60 acts as an optical condenser serving to decrease light losses and brighten a diffuser 62 located adjacent a target 64. The target 64 is generally transparent, but has a reflective pattern 65 (see FIGURE 2) disposed thereon. The pattern 65 is illuminated by a lamp 66 having a known luminous energy output. The level of illumination of the pattern 65 serves as a standard of reference during operation of the photometer. As described above, light entering the photometer from the scene is directed to the diffuser 62 where it is displayed as a particular brightness level. In the operation of the photometer, the viewer visually compares the level of illumination of the diffuser 62, as seen through transparent areas 67 of the target 64 unobstructed by the pattern 65, with the level of illumination of the pattern 65, serving as a standard of reference. The photometer aperture 43 is then varied by rotating sleeve 11 until the level of illumination of the diffuser 62 equals the level of illumination of the pattern 65. At this setting of the photometer aperture 43, the target 64 will appear to be of uniform brightness, and the film exposure aperture will be properly set to account for the relative brightness of the scene to be photographed.

The importance of providing the lens 60 to brighten the diffuser 62 now becomes apparent. The eye can more accurately and easily discriminate between relative levels of brightness in ranges above the minimum threshold of vision.

It is also evident from the above discussion that the diffuser 62 should, for optimum performance of the photometer, display the brightness level of the scene uniformly throughout the area of the diffuser 62. This can be accomplished in many ways, as, for example, by forming lenticular beads on the surface, similar to the beads 52 on prism 40. Another satisfactory arrangement would be to provide on opposed surfaces of the diffuser 62 transversely oriented lenticular ribs. A less efficient way would be to frost one or both surfaces of the diffuser 62.

Tracing the light path from the target 64 to the viewer, a molded baffle member 68, having a view opening 70, blocks stray light and provides an unobstructed path for the reflected and transmitted light from the target 64 to the photometer eye lens 31. As set forth above, the eye lens 31 forms an integral part of member 29. The eye lens 31 enables the viewer to focus his eyes upon the target 64.

A sloping planar surface 72 partially defines a prism formed integrally with the eye lens 31. The prismatic lens 31 serves to deflect the light back again to its original direction. Thus the prismatic lens 60 and the prismatic eye lens 31, in combination, act to vertically displace the axis of the light entering the photometer through window 32.

A filter 74 located over a hollow 76 in the member 29 transmits only monochromatic light. This is important for the reason that the spectral composition of the light entering from the scene, as displayed by the diffuser 62, is different from that radiated from lamp 66 and reflected from the pattern 65 on the target 64. It has been found that the human eye is more capable of perceiving contrasts in brightness of monochromatic light than non-monochromatic light.

By this invention then, an optical system has been provided for a comparison photometer which improves the accuracy and performance of the photometer, and which is highly reliable and inexpensive.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. In a comparison photometer including a transparent target having a reflective pattern thereon and a source of light for illuminating the pattern, the combination comprising:
   (a) means defining an opening for admitting light from the scene to be photographed into the photometer;
   (b) a refracting prism adjacent said opening for efficiently collecting light from the scene, said prism having a base and planar surfaces sloping divergingly away from the scene, the slope of said planar surfaces and the boundaries of said opening establishing a predetermined collection angle for light entering the photometer, said base having lenticular means formed thereon and evenly spaced thereover for uniformly distributing the light collected from the scene over the area of said base;
   (c) means defining a variable aperture adjacent said base, whereby varying the area of said aperture produces a proportional change in the amount of light admitted through said aperture to the target;
   (d) a diffuser adjacent the target for displaying the relative level of illumination of the scene; and
   (e) an eye lens to enable the user to focus on the target to compare the relative levels of illumination transmitted therethrough and reflected therefrom.

2. In a comparison photometer including a transparent target having a reflective pattern thereon and a source of light for illuminating the pattern, the combination comprising:
   (a) means defining an opening for admitting light from the scene to be photographed into the photometer;
   (b) a pyramidal refracting prism adjacent said opening for efficiently collecting light from the scene, said prism having a base and planar surfaces sloping divergingly away from the scene, the slope of said planar surfaces and the boundaries of said opening establishing a predetermined collection angle for light entering the photometer, said base having lenticular beads formed thereon and evenly distributed thereover for uniformly distributing light collected from the scene over the area of said base;

(c) means defining a variable aperture adjacent said base, whereby due to the light distributive effect of said lenticular beads, varying the area of said aperture produces a proportional change in the amount of light admitted through said aperture to the target;

(d) a diffuser adjacent the target for displaying the relative level of illumination of the scene;

(e) optical condensing means between said diffuser and said aperture for increasing the brightness of said diffuser; and (f) an eye lens to enable the user to focus on the target to compare the relative levels of illumination transmitted therethrough and reflected therefrom.

3. In a photographic camera having an exposure aperture, a comparison photometer, comprising:

(a) means defining an opening adjacent said exposure aperture for admitting light from the scene to be photographed into the photometer, the optical axis of said opening being adjacent and parallel to the axis of the exposure aperture;

(b) a pyramidal refracting prism adjacent said opening for efficiently collecting light from the scene, said prism having a base nad planar surfaces sloping divergingly away from the scene, the slope of said planar surfaces and the boundaries of said opening establishing a predetermined collection angle for light entering the photometer, said base having lenticular beads formed thereon and evenly distributed thereover for uniformly distributing light collected from the scene over the area of said base;

(c) means defining a variable aperture adjacent said base of said prism, whereby varying the area of said aperture produces a proportional change in the amount of light admitted through said aperture;

(d) prism means behind said variable aperture for altering the optical axis of said opening to direct admitted light divergently away from the axis of said exposure aperture;

(e) a transparent target having a reflective pattern theron positioned in the path of light redirected by said prism means;

(f) a diffuser adjacent said target for displaying the relative level of illumination of the scene; and (g) a comparison lamp for illuminating said pattern on said target.

4. A photometer comprising:

(a) means defining an opening for admitting light from the scene to be photographed into the photometer;

(b) a refracting prism adjacent said opening for efficiently collecting light from the scene, said prism having a base and planar surfaces angled with respect to the scene, the angles of said planar surfaces and the boundaries of said opening establishing a predetermined collection angle for the light entering the photometer, said prism having lenticular means formed on said base for uniformly distributing the light collected from the scene;

(c) means defining a variable aperture adjacent said prism, whereby varying the area of said aperture produces a proportional change in the amount of light admitted through said aperture into the photometer and (d) means for measuring the amount of light admitted through said aperture.

References Cited

UNITED STATES PATENTS

| 2,112,701 | 3/1938 | Leitz | 95—10 |
| 2,248,758 | 7/1941 | Higonnet et al. | 88—23.6 |
| 2,987,954 | 6/1961 | Sick | 88—23.6 X |
| 3,323,430 | 6/1967 | Cooper | 88—23.6 X |

JEWELL H. PEDERSEN, *Primary Examiner.*

W. A. SKLAR, *Assistant Examiner.*

U.S. Cl. X.R.

95—10; 350—167, 193, 286; 356—219, 233